(12) United States Patent
Chang

(10) Patent No.: US 7,718,141 B2
(45) Date of Patent: May 18, 2010

(54) AUTOMATIC VOC CONCENTRATION CONTROL APPARATUS AND IMAGE FORMING APPARATUS HAVING THE SAME

(75) Inventor: Woong-jae Chang, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 910 days.

(21) Appl. No.: 11/224,031

(22) Filed: Sep. 13, 2005

(65) Prior Publication Data

US 2006/0062703 A1   Mar. 23, 2006

(30) Foreign Application Priority Data

Sep. 21, 2004   (KR) .................. 10-2004-0075383

(51) Int. Cl.
*B01D 53/34* (2006.01)
*F01N 3/00* (2006.01)
*B01J 19/00* (2006.01)

(52) U.S. Cl. .............. 422/168; 422/169; 422/170; 422/171; 422/172; 422/173; 422/174; 422/175; 422/176; 422/177; 422/178; 422/179; 422/180; 422/181; 422/182; 422/183; 422/198

(58) Field of Classification Search .............. 422/198, 422/173, 168–183
See application file for complete search history.

(56) References Cited

U.S. PATENT DOCUMENTS 3,394,756 A * 7/1968 Warner et. al. .............. 165/110
3,420,069 A * 1/1969 Booth .......................... 62/93
4,850,117 A * 7/1989 Venkat et al. ................ 34/470
5,707,595 A * 1/1998 Weigold et al. .......... 422/186.3
5,737,674 A * 4/1998 Venkatesan et al. ......... 399/250
6,094,549 A * 7/2000 Hiraoka et al. ............... 399/93
6,427,449 B1 * 8/2002 Logan et al. ................ 62/3.4

FOREIGN PATENT DOCUMENTS

| JP | 8-295013 | 11/1996 |
| KR | 1999-018759 | 3/1999 |
| KR | 2001-0007885 | 2/2001 |
| KR | 2002-0061087 | 7/2002 |
| SG | 77667 A1 * | 1/2001 |

* cited by examiner

Primary Examiner—Walter D Griffin
Assistant Examiner—Natasha Young
(74) Attorney, Agent, or Firm—Roylance, Abrams, Berdo & Goodman, L.L.P.

(57) ABSTRACT

An automatic VOC concentration control apparatus is capable of adjusting the concentration of VOC in a catalytic device under a predetermined value. The automatic VOC concentration control apparatus includes a housing having an inlet port and an outlet port for introducing and discharging VOC vapor, respectively, one or more cooling tubes for cooling the VOC vapor introduced through the inlet port, and one or more porous members for holding droplets of VOC liquid thereon as the VOC vapor is condensed into liquid.

18 Claims, 4 Drawing Sheets

AUTOMATIC VOC CONCENTRATION CONTROL APPARATUS AND IMAGE FORMING APPARATUS HAVING THE SAME

CROSS-REFERENCE TO RELATED APPLICATIONS

This application claims the benefit of Korean Patent Application No. 2004-75383 filed Sep. 21, 2004 in the Korean Intellectual Property Office, the disclosure of which is incorporated herein by reference in its entirety.

BACKGROUND OF THE INVENTION

1. Field of the Invention

The present invention relates to a catalytic apparatus for treating VOC (Volatile Organic Compound) vapor generated in an image forming apparatus using liquid toner for printing, and to discharge a harmless gas. The invention is also directed to an automatic VOC concentration control apparatus capable of controlling the concentration of the VOC vapor introduced into the catalytic apparatus not to exceed a predetermined value. The invention is further directed to an image forming apparatus having an automatic VOC concentration control apparatus.

2. Description of the Related Art

In general, an image forming apparatus using liquid toner for printing transfers an image developed by the liquid toner on a photoconductor to a print medium, and then feeds the image-transferred print medium through a high temperature/high pressure fixing apparatus, so that the transferred image is fixed to the print medium. In the process of fixing the image to the print medium, the organic compound of the liquid toner is vaporized by the high temperature, whereby VOC vapor is generated. Since such VOC is harmful, it shall not be discharged to the atmosphere as it is. Accordingly, a conventional wet type image forming apparatus has an apparatus 5 for turning VOC vapor generated in the image forming unit 3 into harmless gas and then discharging the harmless gas, as shown in FIG. 1. Typically, a VOC vapor treating apparatus in an image forming apparatus 1 is a catalytic apparatus. The catalytic apparatus decomposes VOC vapor into harmless gas that includes $CO_2$, $H_2O$ or the like using catalyst such as platinum and discharges the harmless gas to the atmosphere.

Such a catalytic apparatus is designed on the basis of the maximum amount of VOC vapor which is expected to be generated in an image forming apparatus during use. However, since the maximum amount of VOC vapor is not always generated while printing, the efficiency of the catalyst is poor. That is, since it is necessary to use an amount of catalyst more than that capable of treating an average amount of VOC vapor expected to be generated, the capacity of the catalyst exceeds the normal requirements, thereby increasing the manufacturing costs of an image forming apparatus.

However, if such a catalytic apparatus is designed on the basis of an average amount of VOC vapor generated in order to save the costs, there is a risk that the catalytic apparatus may discharge VOC vapor to the atmosphere without fully treating the VOC vapor introduced into the catalytic apparatus when the generated VOC vapor exceeds the predetermined average amount. In addition, since the catalytic reaction for decomposing VOC is an exothermic reaction, the catalyst may overheat, degrade and lose its capability if it decomposes VOC vapor exceeding the design capacity of the catalytic apparatus. Therefore, there is a problem in that the life span of the catalyst is reduced.

SUMMARY OF THE INVENTION

Accordingly, the present invention solves the above-mentioned problems. One object of the present invention is to provide an automatic VOC concentration control apparatus which can maintain the concentration of VOC vapor introduced into a catalytic apparatus of an image forming apparatus to a level not exceeding a predetermined value. This reduces the amount of catalyst compared to that for treating a maximum amount of VOC vapor generated in the image forming apparatus.

Another object of the present invention is to provide an automatic VOC concentration control apparatus which allows VOC vapor, of which the concentration does not exceed a predetermined level, to be introduced into a catalytic apparatus, thereby extending life span of the catalyst of the catalytic apparatus.

Still another object of the present invention is to provide an image forming apparatus provided with an VOC concentration apparatus as mentioned above, with reduced costs for installing and maintaining the catalytic apparatus.

In order to achieve the above-mentioned objects, there is provided an automatic VOC concentration control apparatus comprising: a housing having an inlet port and an outlet port for introducing and discharging VOC vapor, respectively; one or more cooling tubes for cooling the VOC vapor introduced through the inlet port; and one or more porous members for holding droplets of VOC liquid thereon as the VOC vapor is condensed into liquid.

In the apparatus, the one or more cooling tubes are arranged vertical to the flow direction of the VOC vapor and installed through the housing. In that event, it is preferable if plural cooling tubes are arranged in plural rows. In addition, the cooling tubes in each row may be arranged to alternate with those in an adjacent row, respectively.

In addition, the porous members may be respectively located in each space formed between the plural rows of the tubes. In that event, it is preferable to install an additional porous member to be in close contact with the outlet port on an upstream side of the outlet port. The porous members may be formed from one material selected from the group consisting of fine wire mesh, cotton, and sponge.

According to another aspect of the present invention, there is provided an automatic VOC concentration control apparatus is provided comprising: a housing having an inlet port and an outlet end for introducing and discharging VOC vapor, respectively, wherein the cross-sectional area of the housing is larger than that of the inlet port; one or more cooling tubes for cooling the VOC vapor introduced through the inlet port; and one or more porous members for holding droplets of VOC liquid thereon as the VOC vapor is condensed into liquid.

In the apparatus, the housing may be formed in a rectangular shape in cross-section, and the one or more cooling tubes may be arranged vertical to the flow direction of the VOC vapor and installed through the housing.

Preferably, plural cooling tubes are arranged in plural rows.

In addition, the porous members may be respectively located in each space formed between the plural rows of the tubes and an additional porous member may be installed to be in close contact with the outlet port on an upstream side of the outlet port.

Preferably, a vapor guide plate is installed at the inlet port side in the housing.

Still, according to another aspect of the present invention, there is provided an image forming unit for performing print with liquid toner, comprising: an automatic VOC concentration control apparatus for controlling the concentration of VOC vapor introduced from the image forming unit to a level not exceeding a predetermined value and then discharging the VOC vapor; and a catalytic apparatus for treating the VOC vapor introduced from the automatic VOC control apparatus and then discharging the product formed by the treatment to the atmosphere.

The automatic VOC concentration control apparatus comprises: a housing having an inlet port and an outlet port, which are communicated with the image forming unit and the catalytic unit, respectively, wherein the housing forms a passage for the VOC vapor; one or more cooling tubes for cooling the VOC vapor introduced through the inlet port; and one or more porous members for holding droplets of VOC liquid thereon as the VOC vapor is condensed into liquid.

As described above in a few exemplary embodiments of the present invention, an automatic VOC concentration control apparatus can keep the concentration of the VOC of the catalytic apparatus under a maximum degree, and therefore, when applied to the front of the catalytic apparatus, can reduce the use of catalytic medium considerably from a conventional case in which a catalytic medium is employed to meet the maximum requirement of VOC treating of an image forming apparatus.

Additionally, with the automatic VOC concentration control apparatus according to the present invention, because only the vapor of the VOC under a predetermined concentration is allowed to the catalytic apparatus, the maximum temperature from the vapor decomposition is controlled below a predetermined degree. Accordingly, the catalytic medium is prevented from overheating, and the lifespan of the catalyst is prolonged.

Therefore, an image forming apparatus using an automatic VOC concentration control apparatus according to the present invention can greatly reduce installation and maintenance costs for the catalytic apparatus.

BRIEF DESCRIPTION OF THE DRAWINGS

The above aspects and features of the present invention will be more apparent from the description for certain embodiments of the present invention taken with reference to the accompanying drawings, in which.

DETAILED DESCRIPTION OF THE PREFERRED EMBODIMENTS

The embodiments of the present invention will be described in more detail with reference to the accompanying drawings.

The details defined in the description such as a detailed arrangement and elements are provided to assist in a comprehensive understanding of the invention but are not intended to be limited. Thus, it is apparent that the present invention can be carried out without those defined details. Also, well-known functions or arrangements are not described in detail since they would unnecessarily obscure the invention.

Figure 1:
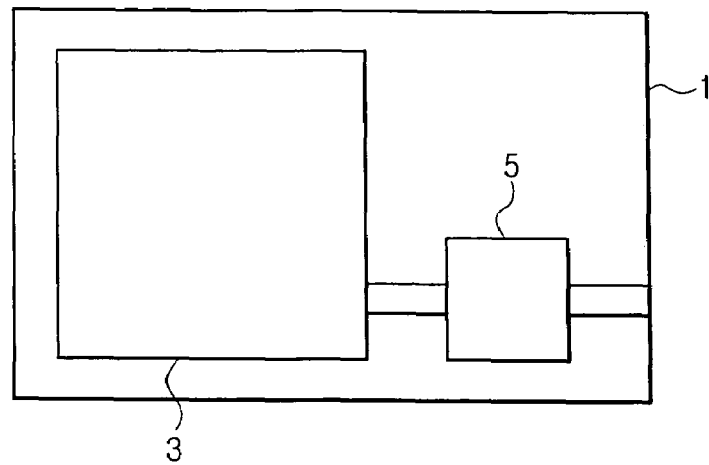
FIG. 1 is a schematic diagram of an image forming apparatus having a VOC treating apparatus according to the prior art.
Figure 2:
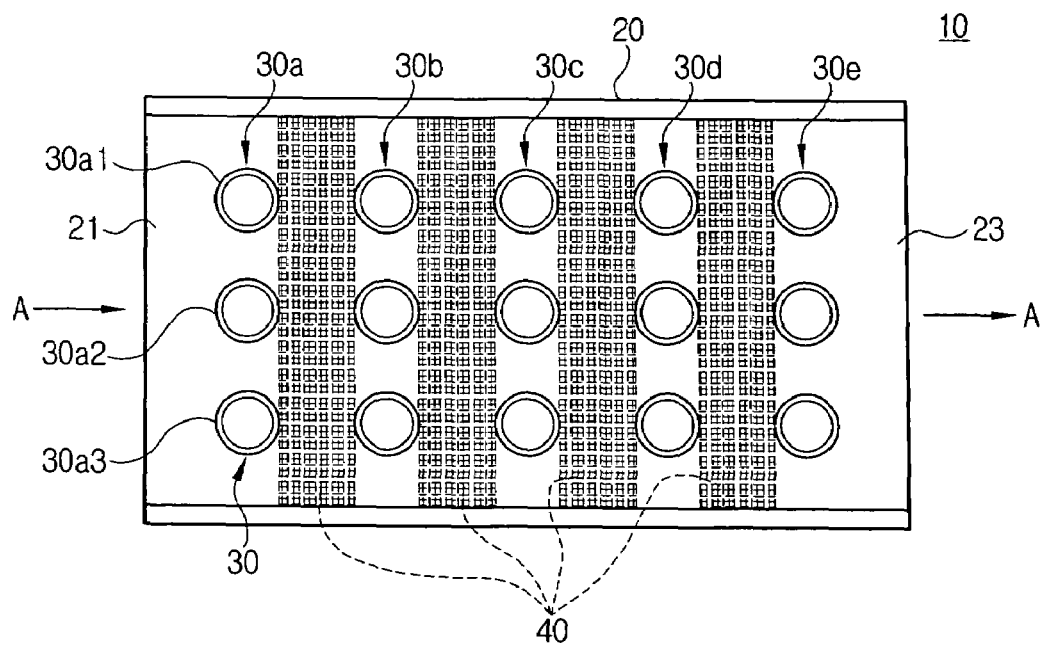
FIG. 2 is a top plan view of a first embodiment of an automatic VOC concentration control apparatus according to the present invention.
Figure 3:
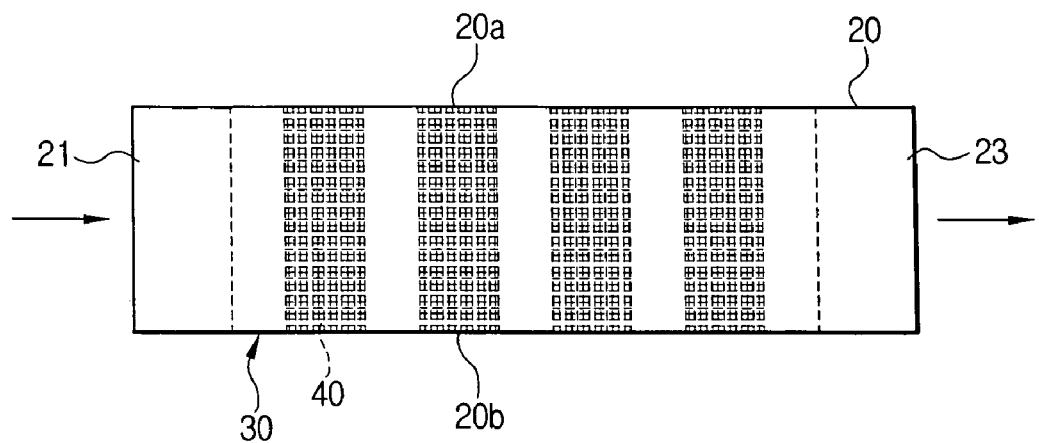
FIG. 3 is a front elevational view of the automatic VOC concentration control apparatus of FIG. 1.

Referring to FIGS. 2 and 3, an automatic VOC concentration control apparatus 10 according to a first embodiment of the present invention comprises a housing 20, plural cooling tubes 30 and plural porous members 40.

One end of the housing 20 is provided with an inlet port 21 communicating with a source of VOC vapor such as an image forming unit of an image forming apparatus so that the VOC vapor is introduced into the inlet port 21 and the other end of the housing 20 is provided with an outlet port 23 discharging VOC vapor and communicating with a VOC treating apparatus such as a catalytic apparatus. Although the housing may take a form of a circular shape in cross-section, it is preferable to form the housing in a rectangular shape in cross-section.

The cooling tubes 30 are installed between the inlet port 21 and the outlet port 23 within the housing 20 and serves to cool VOC vapor introduced into the inlet port 21 not to exceed a predetermined temperature, so that the concentration of the VOC vapor discharged through the outlet port 23 is maintained at a level not exceeding a predetermined value. The size, arrangement and location of the cooling tubes 30 can be modified to lower the temperature of the VOC vapor to such an extent that the concentration of the VOC vapor discharged through the outlet port 23 can be maintained at a level not exceeding the design capabilities of the catalytic apparatus.

Figure 4:
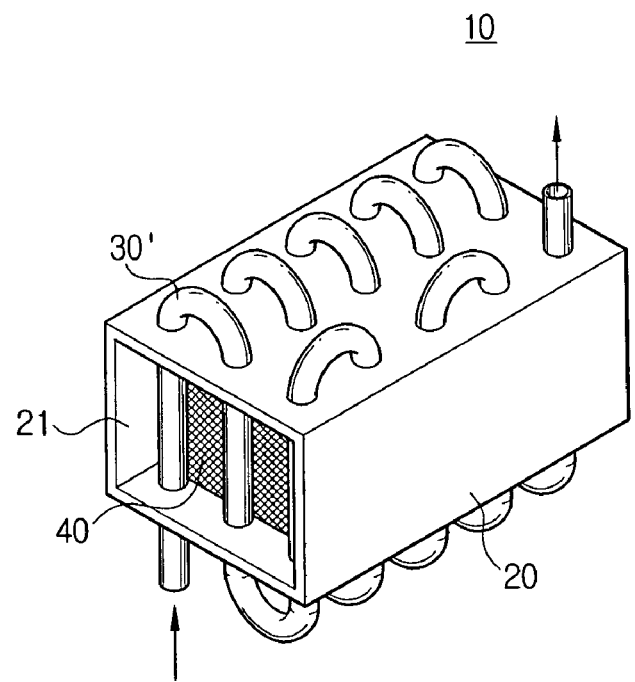
FIG. 4 is a perspective view showing another example of a cooling tube of the automatic VOC concentration control apparatus.

FIGS. 2 and 3 show an example of cooling tubes 30. In this example, circular cross-sectioned tubes are employed for the cooling tubes 30, and the cooling tubes 30 are arranged perpendicular and vertical to the flow direction (direction indicated by arrow A) of VOC vapor. As shown, the cooling tubes 30 are installed through top and bottom surfaces 20a, 20b of the housing 20. Accordingly, the vapor of the VOC flowing along the outer side of the cooling tubes 30 is cooled by the air which passes through the cooling tubes 30. In addition, the cooling tubes 30 are arranged in plural rows 30a, 30b, 30c, 30d, 30e, each row having plural cooling tubes 30a1, 30a2, 30a3 arranged in a line as shown in FIG. 2. In this case, the temperature of the discharged VOC vapor can be determined by controlling the diameter of the cooling tubes 30, the number of the cooling tubes 30a1, 30a2, 30a3 of each row, and the number of the rows of the cooling tubes. In the example shown in FIG. 2, three cooling tubes 30a1, 30a2, 30a3 form one row 30a, and five rows 30a, 30b, 30c, 30d, 30e are located in parallel. In addition, if the plural cooling tubes 30 are connected to form one cooling tube 30' as shown in FIG. 4 and coolant such as water flows through the cooling tube 30', it is possible to increase the cooling capacity of the cooling tube 30'.

The porous members 40 are formed from a material having so many voids or openings that the VOC vapor introduced into the inlet port 21 of the housing 20 can flow through the members 40 and VOC liquid can be deposited on the porous members 40 when the VOC vapor is cooled by the cooling tubes 30 and condensed into liquid. That is, the porous members 40 serve to hold VOC liquid thereon in a condensed state when the concentration of VOC vapor is high enough to condense into liquid while passing through the porous members 40. The liquid held on the porous members 40 can be easily vaporized later when the VOC vapor passing through the porous members 40 is in low concentration.

Such a porous member 40 can be a wire mesh, sponge, cotton, etc. which are formed to have a predetermined thickness. In this embodiment, the porous members 40 formed from fine wire mesh are respectively installed in each space formed between the plural rows 30a, 30b, 30c, 30d, 30e of the cooling tubes as shown in FIGS. 2 and 3. In addition, it is preferable to provide an additional porous member 40 just before the outlet port 23 in the upstream side, so that the condensed VOC particles cannot be directly introduced into the catalytic apparatus (see FIG. 5). Unless the porous members 40 are employed, condensed VOC particles or droplets are collected on the bottom of the housing 20 that are formed from VOC vapor of high concentration introduced into the housing 20. However, because the liquid collected on the bottom of the housing 20 is not readily vaporized, VOC liquid does not readily vaporize even when a low concentration of VOC vapor passes through the housing. Consequently, most of the harmful VOC will remain in the liquid state in the housing 20 without being treated by the catalytic apparatus. However, although not shown in the drawings, if the outer surfaces of the cooling tubes 30 and/or the inner surfaces of the housing 20 are provided with cooling fins or the like such that VOC vapor in high concentration passing through the housing is condensed on the cooling fins or the like, and that the VOC liquid held on the fins or the like is easily vaporized when the VOC vapor of low concentration passes through the housing 20, it is not necessary to employ such porous members 40. That is, where the inner construction performs the function of the porous members 40 described above, it is possible to omit such a porous member 40.

Now, the operation of the automatic VOC concentration control apparatus according to the first embodiment will be described.

The VOC vapor introduced into the inlet port 21 of the housing 20 passes by the cooling tubes 30 and through the porous members 40 and is discharged through the outlet port 23. In that event, if the concentration of the introduced VOC vapor is higher than the ability of the catalytic apparatus communicated with the outlet port 23, a part of the VOC vapor is cooled by the cooling tubes 30 and condensed into liquid. Therefore, the concentration of the VOC vapor discharged through the outlet port 23 will not exceed the design concentration and will be within the acceptable limits. The condensed VOC will be deposited around the plural openings of the porous members 40 without being dropped onto the bottom of the housing 20.

In addition, if the concentration of VOC vapor is lower than the acceptable concentration when the vapor is introduced into the inlet port 21 of the housing 20, the vapor will not condense while passing through the housing 20 and the VOC liquid having condensed on the porous members 40 will be vaporized due to the difference in concentration, thereby increasing the concentration of the VOC vapor while the vapor passes through the housing 20. Therefore, the concentration of the VOC vapor discharged from the outlet port 23 may be increased up to the design concentration and limits of the catalyst apparatus. If condensed VOC liquid is not present in the housing 20 or its quantity is small, the introduced VOC vapor is discharged substantially without undergoing any change in concentration. That is, the automatic VOC concentration control apparatus 10 serves as a condenser or an evaporator depending on the concentration of VOC vapor as being introduced, thereby rendering the concentration of VOC vapor discharged from the outlet port 23 to be maintained without exceeding a predetermined level (the design concentration of the catalytic apparatus).

Figure 5:
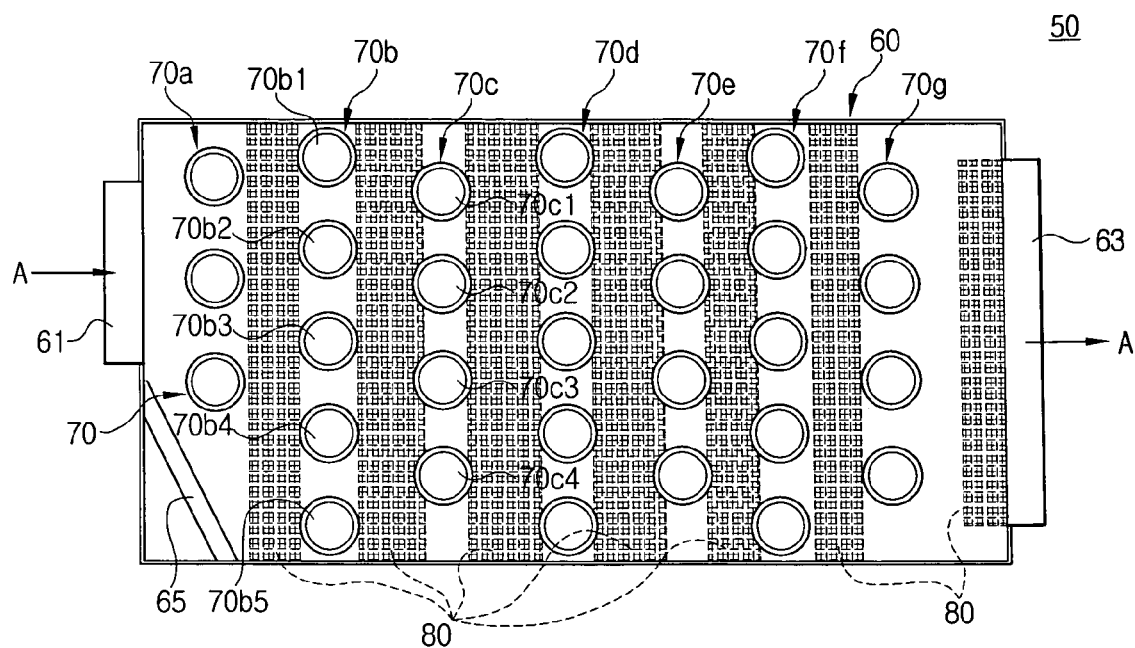
FIG. 5 is a top plan view showing a second embodiment of an automatic VOC concentration control apparatus according to the present invention.
Figure 6:
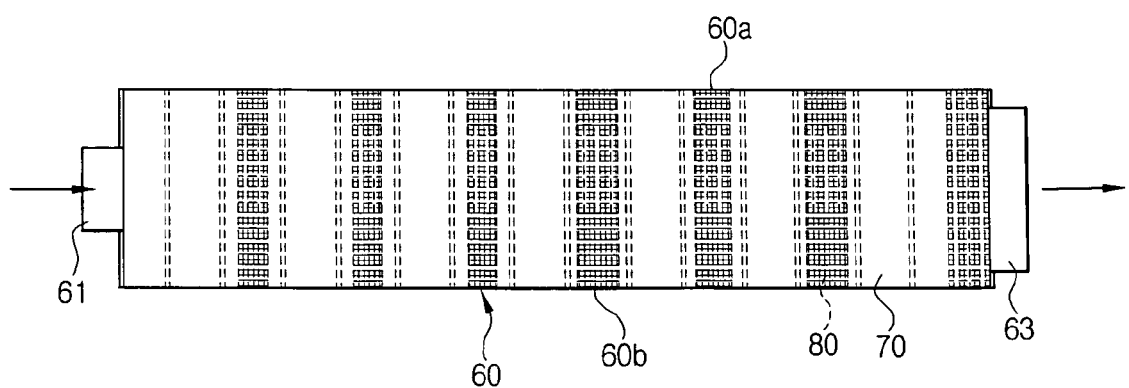
FIG. 6 is a front elevational view of the automatic VOC concentration control apparatus of FIG. 5.

FIGS. 5 and 6 are top plan and front elevational views of the second embodiment of the inventive automatic VOC concentration control apparatus, respectively.

Referring to FIGS. 5 and 6, the automatic VOC concentration control apparatus 50 according to the second embodiment comprises a housing 60, plural cooling tubes 70, and plural porous members 80.

One end of the housing 60 is provided with an inlet port 61, which is communicated with a source of VOC vapor such as an image forming unit of an image forming apparatus and through which the VOC vapor is introduced into the housing 60, and the other end is provided with an outlet port 63, which is communicated with a VOC treating apparatus such as a catalytic apparatus and through which the VOC vapor is discharged from the housing 60. The cross-sectional area of the inlet port 61 is smaller than that of the housing 60. In the illustrated embodiment, the outlet port 63 has a diameter greater than the diameter of inlet port 61. Therefore, the flow rate of the VOC vapor introduced into the inlet port decreases as the vapor passes through the housing. If the flow rate of the vapor decreases, the VOC vapor cooling efficiency of the cooling tubes 70 increases. In addition, it is preferable to provide a vapor guide plate 65 inside of the inlet port 61 so that the VOC vapor introduced through the inlet port 61 can flow smoothly. Although the housing 60 may take a circular shape in cross-section, it is preferable to form the housing 65 in a rectangular shape in cross-section as shown in FIGS. 5 and 6.

The cooling tubes 70 are installed between the inlet port 61 and the outlet port 63 within the housing 20 and serve to cool the VOC vapor introduced into the inlet port 61 to a temperature not higher than a predetermined temperature, so that the concentration of the VOC vapor discharged through the outlet port 23 is maintained substantially constant. The size, arrangement and location of the cooling tubes 70 can be selectively designed to lower the temperature of the VOC vapor to such an extent that the concentration of the VOC vapor discharged through the outlet port 63 can be maintained not higher than the design concentration and limits of the catalytic apparatus connected to the outlet port 63 of the housing 60. That is, although it is possible to arrange the cooling tubes 70 as shown in FIG. 2 like the first embodiment described above, they are arranged as shown in FIG. 5 in the present embodiment. In this embodiment, circular cross-sectioned tubes are used for the cooling tubes 70 and arranged perpendicular and vertically in relation to the flow direction of the VOC vapor (in the direction indicated by arrow A). That is, the plural cooling tubes 70 are installed through upper and lower surface 60a, 60b of the housing 60. Accordingly, the VOC vapor flowing around the cooling tubes 70 will be cooled by air flowing within the cooling tubes 70. In addition, the cooling tubes 70 are arranged in plural rows 70a, 70b, 70c, 70d, 70e, 70f, 70g, each row having plural cooling tubes arranged in a line. In addition, the cooling tubes of adjacent two rows are arranged to be alternate. For example, as shown in FIG. 5, the cooling tubes 70c1, 70c2, 70c3, 70c4 in the row 70c are located to face the spaces formed between the cooling tubes 70b1, 70b2, 70b3, 70b4, 70b5 in the row 70b adjacent to the row 70c, respectively. In that event, the temperature of the discharged VOC vapor can be determined by controlling the diameter of the cooling tubes 70, the number of the rows of the cooling tubes and the number of the cooling tubes in each row. In the embodiment shown in FIG. 5, three to five cooling tubes form a row and seven rows 70a, 70b, 70c, 70d, 70e, 70f, 70g are arranged in parallel. In addition, if the cooling tubes 70 are connected to form a single cooling tube 70 and coolant such as water flows within the cooling tube 70, it is possible to improve the cooling capacity of the cooling tubes (see FIG. 4).

Since the porous members 80 are identical to the porous members 40 of the automatic VOC concentration control apparatus according to the first embodiment described above, description thereof is omitted.

Next, the operation of the automatic VOC concentration control apparatus 50 according to the second embodiment will be described.

While the VOC vapor introduced into the inlet port 61 of the housing 60 passes through the housing 60 having a cross-sectional area larger than that of the inlet port 61, the flow rate of the VOC vapor decreases. Since the introduced VOC vapor flows along the vapor guide plate 65, the vapor is uniformly dispersed throughout the interior of the housing 60. The VOC vapor introduced into the housing 60 and reduced in flow rate slowly passes the porous members 80 and then flows out of the housing 60 through the outlet port 63. In this event, the automatic VOC concentration control apparatus 50 serves as a condenser or an evaporator depending on the concentration of the VOC vapor, thereby maintaining the concentration of the VOC vapor discharged through the outlet port 63 at a level not exceeding a predetermined value. Because this operation is the same as the automatic VOC concentration control apparatus 10 described above, the operation of the automatic VOC concentration control apparatus 50 is not further described.

Figure 7:
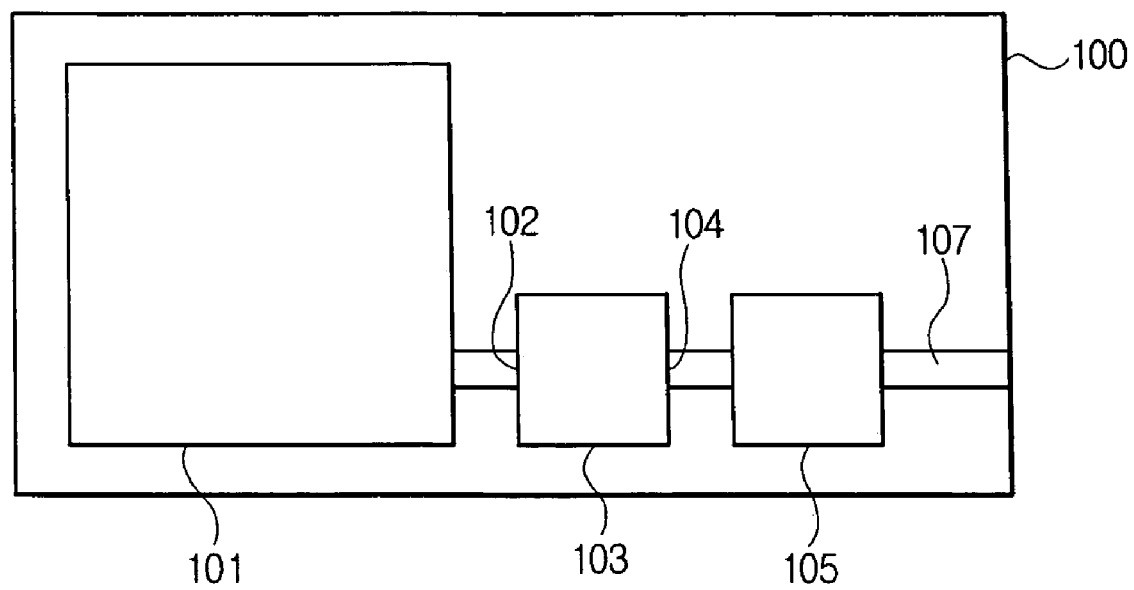
FIG. 7 is a schematic view of an example of an image forming apparatus having the inventive automatic VOC concentration control apparatus.

FIG. 7 is a schematic diagram showing an image forming apparatus having the inventive automatic VOC concentration control apparatus of the invention by way of example.

Referring to FIG. 7, the image forming apparatus 100 comprises an image forming unit 101 for performing print using liquid toner, an automatic VOC concentration control apparatus 103 for controlling the concentration of the VOC vapor introduced from the image forming unit 101 to a predetermined level and then discharging the VOC vapor, and a catalytic apparatus 105 for treating the VOC vapor introduced from the automatic VOC concentration control apparatus 103 and then discharging the product formed by the treatment to the outside.

The image forming unit 101 develops an electrostatic latent image formed on a photoconductor with liquid toner, and then transfers the image formed thereby on the photoconductor to a print medium such as a paper. Next, the image forming unit renders the print medium to pass through a high temperature/high pressure fixing apparatus, thereby fixing the transferred image to the print medium. In that event, due to the high temperature in the process of fixing the liquid toner forming the image, the liquid component of the liquid toner is vaporized and thus VOC vapor is generated.

The automatic VOC concentration control apparatus 103 has an inlet port 102 to communicate with the image forming unit and an outlet port 104 to communicate with the catalytic apparatus, wherein the automatic VOC control unit controls the concentration of VOC vapor introduced from the image forming unit 101 to a level not higher than the design concentration of the catalytic apparatus 105 and then discharges the VOC vapor into the catalytic apparatus 105. Because the construction of the automatic VOC concentration control apparatus is the same as the above-mentioned embodiments, description thereof is omitted.

The catalytic apparatus 105 is configured to decompose the VOC vapor introduced into the catalytic apparatus 105 into harmless components. An image forming apparatus using conventional liquid toner typically employs a platinum catalyst in order to decompose the VOC vapor. In addition, because VOC vapor is reacted at a high temperature (at a temperature not lower than about 200° C.), the catalytic apparatus 105 has a heater to increase the temperature of the introduced vapor to the reaction temperature. Furthermore, the catalytic apparatus 105 is communicated with a vent 107 which allows the decomposed components to be discharged out of the image forming apparatus 100.

If the image forming apparatus prints on a paper in response to a print command, VOC vapor is generated. The quantity of VOC vapor generated varies depending on the printed content. The VOC vapor generated thereby is introduced into the automatic VOC concentration control apparatus 103 through the inlet port 102 communicating with the image forming unit 101. The VOC vapor introduced into the automatic VOC concentration control apparatus 103 is condensed or vaporized depending on its concentration as described above, whereby the concentration of the VOC vapor introduced into the catalytic apparatus 105 will not exceed a predetermined level when it passes through the outlet port 104. The VOC vapor introduced into the catalytic apparatus 105 will be decomposed into harmless components such as $CO_2$ and $H_2O$ by the catalyst and then discharged from the image forming apparatus 100 through the vent 107.

While the preferred embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. An automatic VOC (Volatile Organic Compound) concentration control apparatus comprising:
   a housing having an inlet port and an outlet port for introducing and discharging VOC vapor, respectively;
   one or more cooling tubes for cooling the VOC vapor introduced through the inlet port;
   one or more porous members for holding droplets of VOC liquid thereon as the VOC vapor is condensed into liquid, the porous members collecting the droplets of VOC liquid to lower the amount of VOC vapor discharged from the housing below a predetermined level, and vaporizing the liquid VOC when the VOC vapor introduced through the inlet port has a VOC concentration below the predetermined level;
   a catalyst component downstream of the housing, wherein the VOC vapor is directed to the catalyst component from the outlet port of the housing is within a predetermined concentration range.

2. An automatic VOC concentration control apparatus as claimed in claim 1, wherein the one or more cooling tubes are arranged vertical to the flow direction of the VOC vapor and are installed through the housing.

3. An automatic VOC concentration control apparatus as claimed in claim 1, wherein said one or more cooling tubes extend perpendicular with respect to the flow direction of the VOC vapor.

4. An automatic VOC concentration control apparatus as claimed in claim 2, wherein plural cooling tubes are arranged in plural rows.

5. An automatic VOC concentration control apparatus as claimed in claim 4, wherein the cooling tubes in each row are arranged to be alternate with those in an adjacent row, respectively.

6. An automatic VOC concentration control apparatus as claimed in claim 4, wherein the porous members are respectively located in each space formed between the plural rows of the tubes.

7. An automatic VOC concentration control apparatus as claimed in claim 6, further comprising a porous member in close contact with the outlet port on an upstream side of the outlet port.

8. An automatic VOC concentration control apparatus as claimed in claim 1, wherein the one or more porous members are formed from a material selected from the group consisting of wire mesh, cotton, and sponge.

9. An automatic VOC concentration control apparatus comprising:
- a housing having an inlet port and an outlet end for introducing and discharging VOC vapor, respectively, wherein the cross-sectional area of the housing is larger than that of the inlet port;
- one or more cooling tubes for cooling the VOC vapor introduced through the inlet port;
- one or more porous members for holding droplets of VOC liquid thereon as the VOC vapor is condensed into liquid, the porous members retaining the droplets of VOC liquid to lower the amount of VOC vapor discharged from the outlet below a predetermined level, and where the porous members allow the liquid VOC to vaporize when the VOC vapor introduced through the inlet port has a VOC concentration below the predetermined level;
- a catalyst component downstream of the housing for receiving VOC vapor from the outlet end of the housing, wherein the VOC vapor supplied to the catalyst component from the outlet end of the housing is within a predetermined range.

10. An automatic VOC concentration control apparatus as claimed in claim 9, wherein the housing is formed in a rectangular shape in cross-section.

11. An automatic VOC concentration control apparatus as claimed in claim 10, wherein the one or more cooling tubes are arranged vertical to the flow direction of the VOC vapor and installed through the housing.

12. An automatic VOC concentration control apparatus as claimed in claim 10, wherein said cooling tubes extend perpendicular to the flow direction of the VOC vapor.

13. An automatic VOC concentration control apparatus as claimed in claim 11, wherein plural cooling tubes are arranged in plural rows.

14. An automatic VOC concentration control apparatus as claimed in claim 13, wherein the porous members are respectively located in each space formed between the plural rows of the tubes.

15. An automatic VOC concentration control apparatus as claimed in claim 14, further comprising a porous member in close contact with the outlet port on an upstream side of the outlet port.

16. An automatic VOC concentration control apparatus as claimed in claim 9, wherein a vapor guide plate is installed at the inlet port side in the housing.

17. An image forming apparatus, comprising:
- an automatic VOC concentration control apparatus for controlling the concentration of VOC vapor introduced from the image forming unit to a level not exceeding a predetermined value and then discharging the VOC vapor; and
- a catalytic apparatus for treating the VOC vapor introduced from the automatic VOC control apparatus and then discharging the resulting product formed by the treatment to the atmosphere.

18. An image forming apparatus as claimed in claim 17, wherein the automatic VOC concentration control apparatus comprises:
- a housing having an inlet port and an outlet port, which are in communication with the image forming unit and the catalytic unit, respectively, wherein the housing forms a passage for the VOC vapor;
- one or more cooling tubes for cooling the VOC vapor introduced through the inlet port and condensing the vapor to a liquid when the VOC vapor concentration is above a predetermined level; and
- one or more porous members for holding droplets of VOC liquid thereon as the VOC vapor is condensed into liquid, the porous members retaining the VOC liquid to maintain the VOC vapor concentration discharged from the outlet portion of the housing below a predetermined level, and the porous members allowing the VOC liquid to vaporize when the VOC vapor concentration at the inlet port is below a predetermined level, thereby maintaining the VOC vapor concentration discharged to the catalytic apparatus within a predetermined range.

* * * * *